United States Patent [19]
Marshall et al.

[11] Patent Number: 5,293,987
[45] Date of Patent: Mar. 15, 1994

[54] FEEDER DRIVE

[75] Inventors: Kenneth M. Marshall; Harold E. Patterson, both of Indiana; Paul I. Sleppy, Penn Run; Arthur L. Dean, Indiana, all of Pa.

[73] Assignee: FMC Corporation, Chicago, Ill.

[21] Appl. No.: 839,848

[22] Filed: Feb. 21, 1992

[51] Int. Cl.⁵ .................................................. B65G 27/24
[52] U.S. Cl. .................................... 198/769; 310/36
[58] Field of Search ................. 198/769; 310/36, 37, 310/38, 39

[56] References Cited

U.S. PATENT DOCUMENTS 2,997,158  8/1961  Moskowitz et al. ............... 198/769
4,405,043  9/1983  Burghart .............................. 198/769

FOREIGN PATENT DOCUMENTS 0051409  3/1986  Japan ................................. 198/769

*Primary Examiner*—Cheryl L. Gastineau
*Attorney, Agent, or Firm*—Douglas W. Rudy; Richard B. Megley

[57] ABSTRACT

An electromagnetic exciter for use in powering vibratory equipment includes a plurality of deflectable elastomeric springs in a configuration that allows the spring system to achieve a vertical non-linear spring rate increase beneficial in dual mass electromagnetic feeder and conveyor systems.

14 Claims, 3 Drawing Sheets

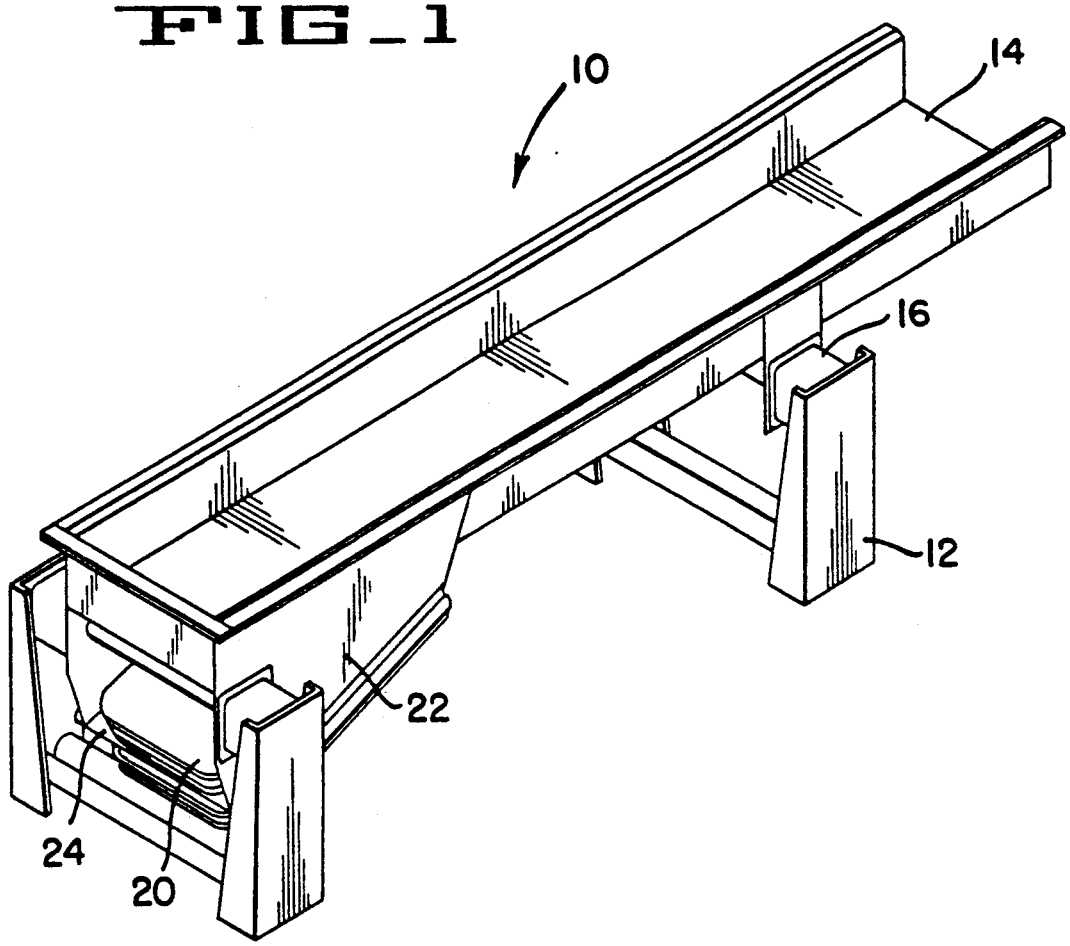
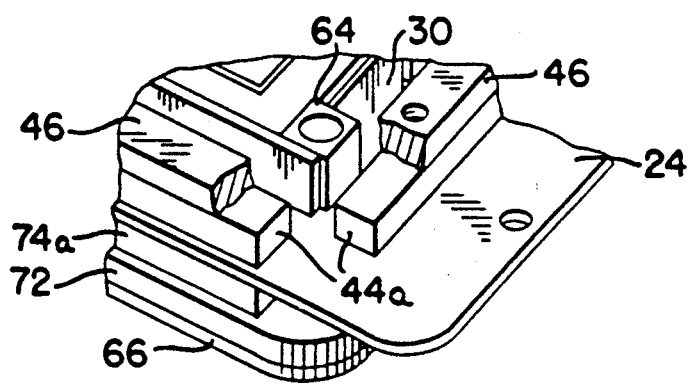

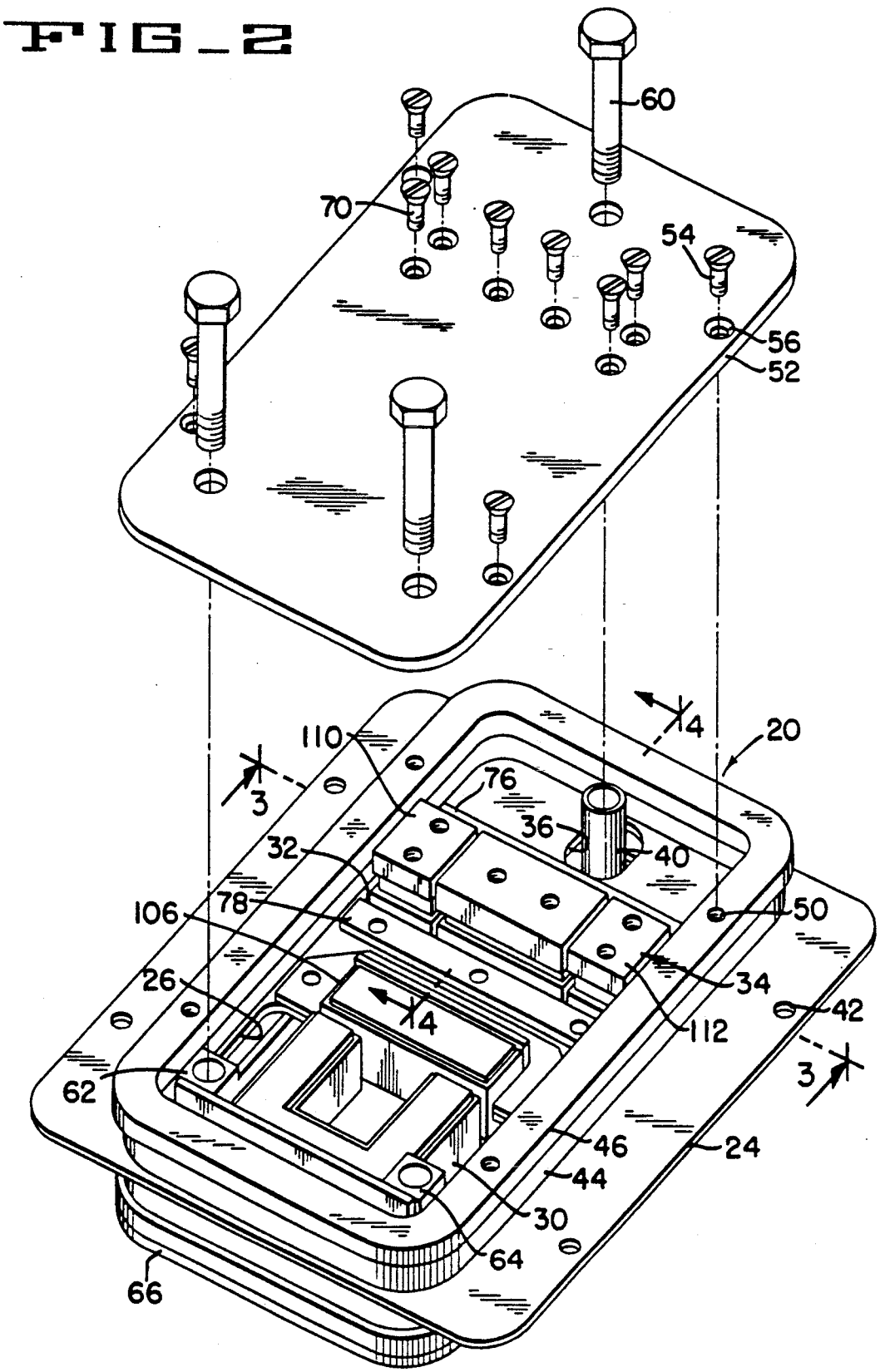

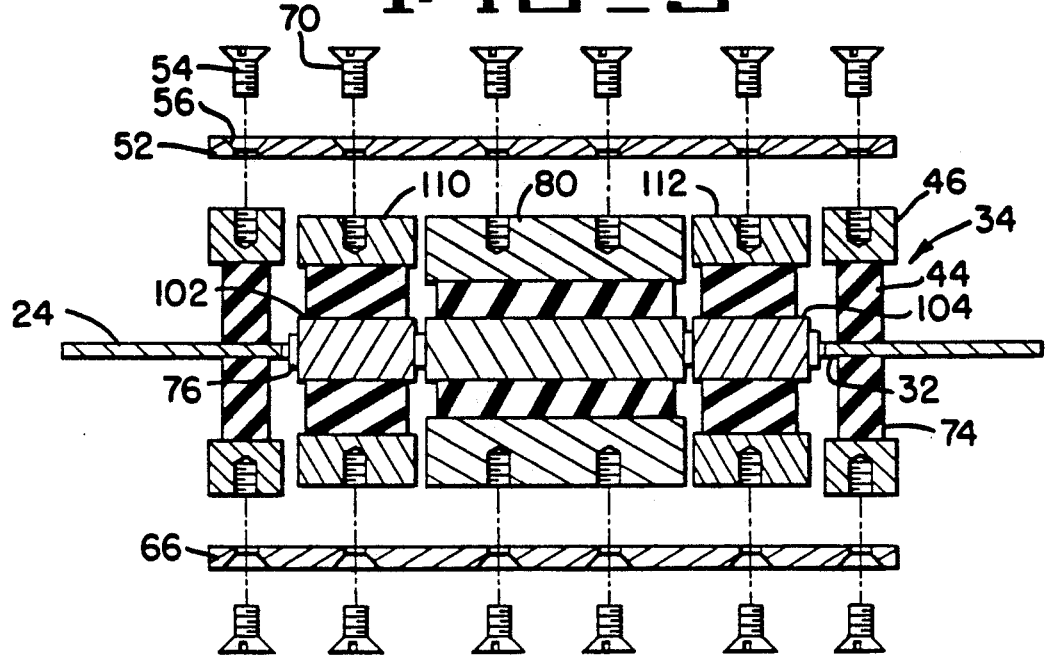
FIG_3
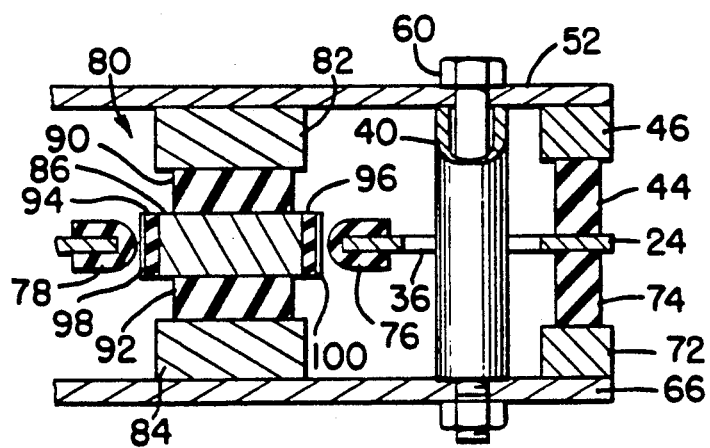
FIG_4

FEEDER DRIVE

This invention has to do with a drive means for imparting vibratory motion to a vibratory conveyor or feeder system. More specifically the drive means is an enclosed device that includes a virtual non-linear spring system operating at resonance or close to resonance.

Various types of drive systems, including mechanical drive systems as well as electrical drive systems, use springs as part of the drive. It has been found advantageous to use a non-linear system of springs in a closing air gap magnet environment, such as the drive described herein, in order to have the spring resistance increase as the armature of an electromagnet approaches the face of the system electromagnet.

The preferred embodiment of the electromagnetic drive presented herein is of a type used in a two mass system including a first mass comprising a conveyor trough, the armature associated with the electromagnet and the product being conveyed in the conveyor trough. The second mass comprises the electromagnet, the magnet housing and any ballast weight used to fine tune the two mass system. Several springs, in the preferred embodiment presented herein elastomeric springs, connect the two masses and are sized to have the system utilize resonant amplification of motion.

Electromagnets produce useful force only when the pole faces are in close proximity to each other. Close in this environment is on the order of one-tenth of an inch or less. As the attractive force of the electromagnet increase approximately with the inverse of the air gap squared it is desirable to have a spring system that resists the increase in force of the electromagnet in the same non-linear ratio of force to distance.

Typically, elastomeric spring systems provide only linear rates of spring rate rise and therefore elastomeric spring systems have been less preferred as spring systems in closing air gap electromagnetic drives where the rise in force generated by the electromagnet is non-linear. Ideally the spring system will have an increasing spring rate. As the spring becomes more deflected as the force of the electromagnet increases as the gap between the electromagnet and the armature decreases.

In this invention a multipart spring system is provided. It includes springs made up of elastomeric and metal laminations of different dimensions that are situated such that sequential contact is effectuated.

One object of the instant invention is to provide an enclosed electromagnetic drive systems that has a non-linear spring system such that the force of the spring system increases as the stroke of the electromagnet increases.

This and other objects of this invention will be apparent by persons having skill in the electromagnetic exciter art from the following detailed description of the invention when read in conjunction with a review of the drawing figures in which:

FIG. 1 is a simplified drawing of a conveyor showing the environment of the invention;

FIG. 2 is a partially exploded view of the invention with the top plate removed to show the interior of the drive;

FIG. 2A is a fragmentary view of portion of FIG. 2;

FIG. 3 is a sectioned view of the springs as taken through plane 3—3 of FIG. 2;

FIG. 4 is a sectioned view of the springs as taken through plane 4—4 of FIG. 2.

The general environment of the invention 10 is shown in FIG. 1. A conveyor trough 14 is mounted through vibration isolators such as 16 to the legs 12. This conveyor, in a preferred embodiment, might be a conveyor having a length of eight to ten feet long and ten to twelve inches wide. Its purpose would be to feed lightweight products such as snack foods, cereals, and other low density products. The conveyor could also be one of a type and size that could be used for transporting many different materials from high density materials such as metallic fasteners to low density material such as foam packaging.

The assignee of this invention is a manufacturer of a wide range of equipment that could use the spring system of this invention. Large "grizzly" coal handling and dewatering equipment, medium size vibratory conveyors for use in mines, cement plants, glass plants and the like, and vibratory bowl parts feeders are just a few of the applications that could use the principal of the invention presented herein.

The conveyor of FIG. 1 includes the electromagnetic drive means 20 which is attached to wing plates 22 which are integral with the conveyor trough 14. The attachment of the drive is facilitated by bolting the drive means 20 through the center plate 24 of the drive means to the wing plates 22.

FIG. 2 is a view of the electromagnetic drive means 20 which shows all the features of the invention. The center plate 24 divides the top portion of the drive means from the bottom portion but each portion is virtually identical with the exception that a power cord, a source of electrical energy, not shown, enters the electromagnetic drive means from the bottom of the unit in order to provide power to energize the electromagnet system. The drive means, which is the invention herein, will be described starting with the center plate 24.

The center plate 24 is provided with two major apertures therein. The first major aperture 26 is an opening at one end of the center plate 24 that will accommodate an electromagnet 30 and an armature 106. The second major aperture 32 is a rectangular opening through the center plate. This second major aperture 32 accommodates a set of springs shown generally as 34 which will be described below.

A lesser aperture 36 is also provided in the center plate 24 in the location shown. This aperture accommodates a tube 40 which serves as a precompression spacer that prevents too much compression on the spring system and is of a certain length to give the desired amount of spring precompression. Apertures such as 42 are simply mounting apertures that allow the drive to be fastened, as by bolts, to the wing plates of the conveyor.

One spring of the spring system is the upper constant spring 44. This spring is an elastomeric spring of generally rectangular shape and rectangular cross section that is bonded to the top surface of the center plate and surrounds or defines the interior of the electromagnetic drive. In a preferred embodiment this upper constant spring is an elastomeric frame having curvilinear transitional corners connecting the sides of the rectangular frame which describe the upper constant spring. The wafer constant spring is shown as a continuous frame of material however it is contemplated that it be discontinuous if desired. FIG. 2A shows such discontinuous frame as 44a and 74a. By being continuous it serves not only as a spring but also as seal to seal the interior of the drive means from exterior ambient contamination.

An inflexible upper frame 46 is bonded to the upper constant spring. In a preferred embodiment this is a metallic element however it could be a nonmetallic element as well. The upper frame 46 has the general shape of the upper constant spring but is somewhat larger in the preferred embodiment shown. Threaded apertures 50, for example, are provided in the upper frame.

The upper frame 46 is fastened to the top plate 52 by means of fasteners such as 54 passing through apertures such as 56 in the top plate into the treaded apertures 50 of the upper frame. This embodiment is shown however it is contemplated that the top plate and the upper frame could be integrally formed as a single unit.

The top plate 52, which is also known as the first magnet support web as it may support the electromagnet 30 between it and the bottom plate or second magnet support web 66, is provided with numerous apertures including three apertures which accommodate bolts su hose bolts respectively pass through the top plate and through the stanions 62 and 64 and the tube 40. They then pass through a bottom plate or second magnet support web 66, which is a mirror image of the top plate 52 with the addition of an aperture to accommodate a power cable, and is secured with nuts (FIG. 4) in a preferred embodiment. Rather than using nuts as fasteners, the bolts 60 could be threaded into treaded apertures in the bottom plate or into threaded apertures in an ancillary weight or weights that could be carried adjacent the bottom plate to help tune the electromagnetic drive means.

A plurality of fasteners such as 70 pass through apertures in the top plate to secure the set of springs 34 to the top plate. Similar fasteners are used to secure the set of springs to the bottom plate as is shown in FIG. 3.

The spring system can best be seen in FIGS. 3 and 4. In these figures the bottom plate 66, the lower frame 72, the lower constant spring 74, the latter two elements similar to the upper frame 46 and the upper constant spring 44 respectively, as well as first and second elastomer bumpers 76 and 78, can all be seen.

As can be seen in FIG. 4 the center spring, generally 80, is composed of several elements. A top block 82 is that block that is fastened to the top plate 52. A bottom block 84 is fastened to the bottom plate 66. Between these blocks there is an intermediate block 86 supported between respective top and bottom spring elements 90 and 92 respectively. These spring elements are bonded to surfaces of the intermediate block and the top and bottom blocks. Elastomeric bumpers 94 and 96 are bonded to the sides of the intermediate block 86 on the sides of the block proximate to the elastomer bumpers 76 and 78 which are carried on the center plate 24 along the edges of the second major aperture in the center plate.

Shown in FIG. 4 are the edges 98 and 1 00 of the far side intermediate block 102. The far side intermediate block 102 and the near side intermediate block 104 are "longer" in FIG. 4 than the intermediate block 86 of the center spring 80.

Returning to FIG. 2 it can be seen that the armature 106 is fastened to the center plate 24 and passes through the center plate approximately an equal amount on each side of the center plate. The electromagnet 30 is attached to support structure integral with the stantions 62 and 64 so that it moves with the top and bottom plates but not with the center plate 24. The electromagnet is shown in a "stripped down" embodiment in that coil windings have not been shown and the device has not been encased in a "potting" material as would normally be the case in a production unit. When the electromagnet is energized the armature 106 is drawn toward the poles of the electromagnet in the well known operating manner.

The functioning of the drive means and the non-linear spring system will be as follows.

In a preferred embodiment each mass of the two mass system will be relatively close in mass to the other. That is the trough mass, wing plates, center plate and armature will be close in mass to the top and bottom plates, the spring systems, the electromagnet and any ballast weights needed to get the two mass close in mass to each other.

The first springs of the spring system, items 44 and 74, the upper and lower constant springs respectively, are sized to have a resonate frequency at the resonant of the feeder system. The set of springs 34 are sized to provide resistance which increases in a virtual non-linear progression as the center plate mounted armature approaches the electromagnet. This is done by means of several bumpers and springs interfacing with each other sequentially. For example, looking at FIG. 4, with the magnet energized the armature and thus the center plate will be urged toward the electromagnet or leftwardly in FIG. 4. The elastomeric bumper 76 on the second major aperture edge of the center plate will contact the elastomeric covered sides of the far side and the near side intermediate sections of the far side 110 and the near side springs. The rounded leading edge of the elastomeric bumper will provide increasing resistance as more surface area of the bumper contacts the sides of the far and near side intermediate sections. These intermediate sections will also be deflected causing the elastomeric blocks on the top and bottom of the far and near side intermediate sections to be deflected in shear.

As the center plate 29 continues to move toward the electromagnet the elastomeric bumper 76 will contact the elastomeric bumper 96 on the side of the intermediate section of the center spring 80. Again the rounded leading edge of the elastomeric bumper 76 will provide increasing resistance as more surface area of the bumper contacts the side of the intermediate section. This intermediate section will also be deflected causing the top and bottom spring elements 90 and 92 to be deflected in shear.

The upper and the lower constant springs 44 and 74 respectively will also be deflected in shear.

The center plate 24 will continue to move leftwardly as the electromagnet continues to pull the armature 106 toward the pole pieces of the electromagnet. The spring system develops greater resistance as the air gap of the magnet decreases to within 0.1 inch. At about this point of linear travel the magnet will be caused to stop as the electromagnet is turned off allowing the spring system to retract toward a position of repose. The spring system will rebound such that the center plate elastomeric bumper 78 will contact the adjacent edges of the far and near side intermediate blocks, the center spring intermediate block, as well as deflecting the constant springs in a direction opposite that from the electromagnetic power-on mode.

The electromagnet, in the preferred embodiment, would be energized for one sine wave of incoming current and then turned off for a second sine wave period. This would result in thirty cycles per second operating speed of the drive means. Other combinations are possible such as; one for one sine wave cycle, off for two sine wave cycles; on for one sine wave cycle, off for three sine wave cycles--depending on the desired operating speed and the feed line frequency.

Various spring rate curves, which appear to be close to non-linear are possible by adjusting the spring rate variables provided by use of elastomeric springs. The cross sectional dimensions of the elastomeric components can be changed. The composition of the elastomers can be changed. The relative sizes of the intermediate blocks can be changed. These, and other changes are possible and have been contemplated by the inventors hereof.

The preferred embodiment set forth above is just one embodiment of the invention. The inventors believe that another embodiment of the invention would have some applicability. In this less-than-preferred embodiment the top and bottom plates would be replaced by web means that would support the spring system—at least a portion of the constant springs and the laminated springs—in the positions shown in the drawing figures. The difference would mean that the drive unit would not be sealed against the elements, but this is not objectionable in all instances. Extra weights could be supported off the web means in order to help tune the device as necessary.

The drive characteristics of the feeder being driven by the drive means can also be affected by adding mass, in the form of weights, to the first mass or to the second mass. It would be usual if the weight were added to the second mass in the event that there was an increase in mass being conveyed by the host feeder or conveyor trough. Such weight could be fastened to the bottom plate of the illustrated embodiment.

It can be appreciated that what has been provided herein is a description of an invention that fulfills the object of this invention. Various nuances of the design, some of which have been discussed above, have been contemplated by the inventors and such nuances of design are believed and intended to be within the spirit and scope of the following claims.

What is claimed is:

1. An electromagnetic drive for use in driving a vibratory article delivery apparatus, said electromagnetic drive comprising:
   a center plate having first and second major apertures formed therethrough;
   an armature carried on said plate;
   a first elastomeric frame fixedly attached to one side of said center plate;
   a second elastomeric frame fixedly attached to the adverse side of said center plate;
   first and second magnet support web means fixedly attached to said first and second elastomeric frame means respectively;
   an electromagnetic fixedly located between said web means, and through said first major aperture of said center plate;
   spring means fixedly located between said first and said second magnet support web means, said spring means passing through said second major aperture of said center plate.

2. The invention in accord with claim 1 wherein said second major aperture has edges proximate to said spring means.

3. The invention in accordance with claim 1 wherein said first and said second elastomeric frame means are each discontinuous.

4. The invention in accordance with claim 1 wherein said first and said second elastomeric frame means are continuous frames of elastomer.

5. The invention in accordance with claim 2 wherein said spring means includes at least one spring having a laminated structure including two elastomeric blocks between non elastomeric means and said elastomeric blocks separated from each other by a non-elastomeric block.

6. The invention in accordance with claim 5 wherein said non-elastomeric block between said elastomeric blocks has elastomeric surfaces attached to two opposing sides thereof.

7. The invention in accordance with claim 6 wherein said center plate second major aperture edges proximate to said spring means are covered with an elastomeric surface.

8. The invention in accordance with claim 7 wherein said elastomeric surface is curvilinear.

9. The invention in accordance with claim 8 wherein said curvilinear elastomeric surface may contact said elastomeric surfaces of said non-elastomeric block.

10. An electromagnetic drive for use in imparting vibratory motion to a host member, the drive comprising:
    a center plate having a top surface and a bottom surface and having first and a second major apertures formed therein;
    an armature supported by said center plate between said first and second major apertures;
    a first elastomeric frame fixedly attached to said top surface of said center plate;
    a second elastomeric frame fixedly attached to said bottom surface of said center plate;
    top frame means fixedly attached to said first elastomeric frame;
    bottom frame means fixedly attached to said second elastomeric frame;
    top plate means attached to said top frame means;
    bottom plate means attached to said bottom frame means;
    an electromagnet fixedly located between said top and bottom plates in said first major aperture, said electromagnet secured for movement with said top and bottom plate means;
    spring means fixedly located between said top and bottom plates in said second major aperture, secured for movement with said top and bottom plates and contactable with said center plate when said center plate moves relative to said top and bottom plates.

11. An electromagnetic drive for use in driving a vibratory article delivery apparatus, said electromagnetic drive comprising:
    a center plate having a first and second major apertures formed therethrough;
    an armature carried on said plate;
    a first elastomeric frame fixedly attached to one side of said center plate;
    a second elastomeric frame fixedly attached to the obverse side of said center plate;
    top frame means fixedly attached to said first elastomeric frame;
    bottom frame means fixedly attached to said second elastomeric frame;
    top and bottom plate means fixedly attached to said top and bottom frame means respectively;

an electromagnet fixedly located between said top and bottom plate means and through said first major aperture of said center plate;

spring means fixedly located between said top and bottom plate means, said spring means passing through said second major aperture of said center plate.

12. The invention in accordance with claim 11 wherein said first and said second elastomeric frame means are each discontinuous.

13. The invention in accordance with claim 11 wherein said first and said second elastomeric frame means are continuous frames of elastomer.

14. The invention in accordance with claim 11 wherein said spring means includes at least one spring having a lamanated structure including two elastomeric blocks between non-elastomeric means, said elastomeric blocks separated from each other by a non-elastomeric block.

* * * * *